United States Patent [19]

Huber

[11] Patent Number: 5,410,315

[45] Date of Patent: Apr. 25, 1995

[54] GROUP-ADDRESSABLE TRANSPONDER ARRANGEMENT

[75] Inventor: Alexander G. Huber, Munich, Germany

[73] Assignee: Texas Instruments Incorporated, Dallas, Tex.

[21] Appl. No.: 986,950

[22] Filed: Dec. 8, 1992

[51] Int. Cl.⁶ .......................................... G01S 13/80
[52] U.S. Cl. ........................................ 342/42; 342/44
[58] Field of Search ............................ 342/42, 44, 51

[56] References Cited

U.S. PATENT DOCUMENTS

| | | | |
|---|---|---|---|
| 3,713,148 | 1/1973 | Cardullo et al. | 343/6.5 R |
| 4,131,881 | 12/1978 | Robinson | 340/825.53 |
| 4,364,043 | 12/1982 | Cole et al. | 342/44 X |
| 4,370,653 | 1/1983 | Crowley | 342/42 |
| 4,912,471 | 3/1990 | Tyburski et al. | 342/42 |
| 4,979,170 | 12/1990 | Gilhousen et al. | 455/12 X |
| 4,983,976 | 1/1991 | Ogata et al. | 342/42 |
| 5,053,774 | 10/1991 | Schuermann et al. | 342/44 |
| 5,124,699 | 6/1992 | Tervoert et al. | 340/825.54 |
| 5,144,314 | 10/1992 | Malmberg et al. | 342/44 |
| 5,268,668 | 12/1993 | Berube | 340/505 |
| 5,351,052 | 9/1994 | D'Hont | 342/42 |

Primary Examiner—John B. Sotomayor
Attorney, Agent, or Firm—Ira S. Matsil; James C. Kesterson; Richard L. Donaldson

[57] ABSTRACT

A responder unit (12) located in spaced relation with respect to an interrogator unit (10) is described. The responder unit (12) has a responder unit receiver (130) for receiving at least one RF interrogation pulse, a responder unit memory (168) containing a potentially unique responder unit group address, a responder unit controller (202) operably connected to the memory (168) for comparing the potentially unique responder unit group address to the Group Address, and a responder unit transmitter (130) for transmitting a RF response when the potentially unique responder unit group address matches the Group Address.

11 Claims, 3 Drawing Sheets

GROUP-ADDRESSABLE TRANSPONDER ARRANGEMENT

CROSS REFERENCE TO RELATED PATENTS

The following coassigned patent application and patent are hereby incorporated herein by reference:

| Pat No./Pat Appl No. | Filing Date | TI Case No. |
|---|---|---|
| 5,053,774 | 2/13/91 | TI-12797A |
| 07,981,635 | 11/25/92 | TI-16688 |

FIELD OF THE INVENTION

This invention generally relates to a transponder arrangement comprising an interrogator unit which transmits at least one RF interrogation pulse to a responder unit which thereupon sends data stored therein back to the interrogator unit in the form of a modulated RF carrier. This invention more particularly relates to a transponder arrangement in which the RF interrogation pulse may be addressed to a group of responder units which thereupon simultaneously send data stored therein back to the interrogator unit in the form of modulated RF carriers.

BACKGROUND OF THE INVENTION

There is a great need for devices or apparatuses which make it possible to identify or detect, as regards their presence at a predetermined location, objects which are provided with such devices or apparatuses in contactless manner and over a certain distance. An additional need exists to be able to simultaneously identify or detect, as regards their presence at a predetermined location, groups of objects having some common identifying feature which are provided with such devices or apparatuses in contactless manner and over a certain distance.

It is for example desirable to request contactless and over a certain distance identifications which are uniquely assigned to a group of objects and which are stored in the devices or apparatuses so that it can be determined whether at least one of the group of objects is at a predetermined location. An example is within a production, warehouse, or commercial environment in which physical characteristics such as product type, color, or customer destination are to be interrogated directly at or in the object without direct access to the object being possible. To accomplish these ends using prior art systems, a search would be initiated using a central database containing at least the information of which unique transponders are available. By way of example, with this method in order to determine all locations for a group of 100 member transponders it would be necessary to initiate 100 lookups in the database and perform 100 searches for the member transponders.

SUMMARY OF THE INVENTION

The invention is based on the problem of providing a transponder arrangement with the aid of which the aforementioned requirements can be fulfilled and with which the necessary responder device can be made very economically and very small so that it can be used for a great variety of purposes, in particular whenever many objects are to be provided with the responder unit.

This problem is solved in the preferred transponder arrangement by providing an energy accumulator within the responder unit by which the energy contained in the RF interrogation pulse is stored. Means are provided to produce a control signal which is utilized to maintain the RF carrier wave and to modulate the RF carrier to be sent back to the interrogator with the stored data. Further means are provided to demodulate from the RF carrier wave data which may be stored in the responder unit memory. Finally, means are provided to store identification addresses within the responder units. These addresses may be unit identification tags or group identification tags or both. The responder units will be designed to receive addresses from the interrogator and respond by sending a RF signal when the address received from the interrogator is consistent with the unit and/or group identification tag stored therein.

A preferred embodiment of the invention comprises an interrogator unit for communicating with cooperating responder units, the interrogator unit having a microprocessor, a transmitter for transmission of at least one RF interrogation signal of a first frequency having a duration predetermined by the microprocessor, an interrogator unit FSK modulator for modulating the RF interrogation signal wherein the modulated interrogation signal includes a Group Address, and a receiver for receiving signal information at the termination of the interrogation signal. The embodiment further comprises a plurality of responder units located in spaced relation with respect to the interrogator unit, each for receiving on a resonant circuit the at least one interrogation signal transmitted from the transmitter of the interrogator unit and returning data as signal information on the resonant circuit to the receiver of the interrogator unit in response to the reception of the at least one interrogation signal. Each of the responder units has an energy accumulator for storing the energy contained in the at least one interrogation signal as received by the responder unit, a responder unit FSK demodulator for demodulating the interrogation signal, a responder unit memory for storing a responder unit group address, a responder unit controller for comparing the responder unit group address to the Group Address, a RF threshold detector, and a triggering circuit to which the RF threshold detector and the responder unit controller is connected. The responder unit further comprises a responder unit controller which is connected for generating a signal to initiate the operation of the carrier wave generator whenever the level of the interrogation signal received at the responder unit drops below a predetermined value. The controller is further operable to detect a match between the responder unit address and the Group Address. The responder unit still further may comprise a carrier wave generator operable for providing a RF carrier of substantially the first frequency, a responder unit FSK modulator for modulating the RF carrier, circuitry operably connected to the output of the carrier wave generator for producing control signals for maintaining and modulating the carrier, circuitry for transmitting the FSK modulated carrier and data from the responder unit back to the receiver of the interrogator unit as signal information, and circuitry for initiating operation of the carrier wave generator in response to the detected power level of the RF interrogation signal decreasing and the presence of a predetermined energy amount stored in the energy accumulator.

Generally, when the responder unit carrier wave generator operates at the substantially the same frequency as the interrogator unit (i.e. at the first frequency), the transponder arrangement is operating in a half-duplex mode in which the responder unit receives an interrogation pulse and responds upon termination of this interrogation pulse. It is a further aspect of this invention that it might be used in a full-duplex transponder arrangement, typically by providing a responder unit carrier wave generator operating at a second frequency so it may respond to the interrogation pulse from the interrogator unit while still receiving signals therefrom without the RF response interfering with the interrogation pulse.

The transponder arrangement according to the invention includes a responder unit which with high efficiency, i.e. high peak power and high data transfer rate, permits the return of the data stored therein to the interrogation device and the reception of commands and data from the interrogation device. According to a preferred embodiment of the invention, the transmission reliability can be increased by transmitting the information several times in succession. The transfer time can be kept so short that interferences to the transfer from outside are not very probable. Because of the high transfer rate it is also possible to arrange the responder unit on very rapidly moving objects without any interference occurring due to the Doppler effect.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
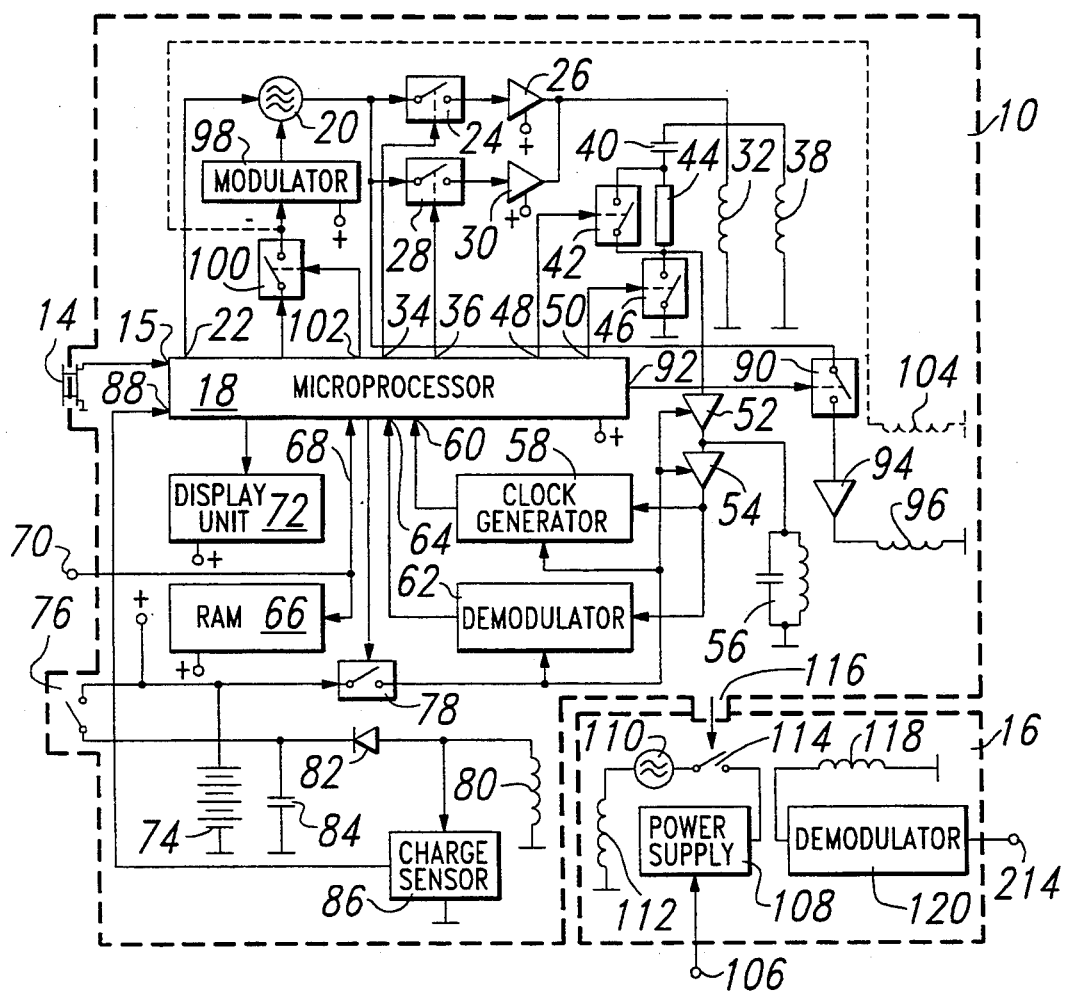
FIG. 1 is a block circuit diagram of the interrogator unit of the transponder arrangement according to the invention and of a base unit cooperating with the interrogator unit.

The transponder arrangement to be described includes an interrogator unit 10 as shown in FIG. 1, and a responder unit 12, as shown in FIG. 2. The interrogator unit 10 is suitable for being held in the hand of an operator and is operable to transmit a RF interrogation pulse upon actuation of a key 14. This interrogator unit 10 also has the capacity of receiving RF signals and detecting information contained in the signals. The RF signals come from the responder unit 12 which replies to the transmission of a RF interrogation pulse by sending back a RF signal. Associated with the interrogator unit 10 is a base unit 16 (see FIG. 1) which is constructed as a stationary unit. The functions of the interrogator unit 10, the responder unit 12 and base unit 16 and their interaction will be described in more detail hereinafter. Firstly, the makeup of these units will be explained.

The interrogator unit 10 contains as central control unit a microprocessor 18 which is responsible for the control of the function sequences. A RF oscillator 20 generates RF oscillations as soon as it has been set in operation by a signal at the output 22 of the microprocessor 18. The output signal of the RF oscillator 20 can be supplied either via a switch 24 and an amplifier 26 or via a switch 28 and an amplifier 30 to a coupling coil 32. The switches 24 and 28 are controlled by the microprocessor with the aid of signals emitted at its outputs 34 and 36 respectively. Coupled to the coupling coil 32 is a coil 38 of a resonant circuit which consists of the coil 38 and the capacitor 40. In series with the coil 38 and the capacitor 40 is a resistor 44 bridgeable by a switch 42 and a further switch 46 lies between the resistor 44 and ground. The switches 42 and 46 are controlled by the microprocessor which emits at its outputs 48 and 50 corresponding control signals. When the switch 46 is closed the resonant circuit comprising the coil 38 and capacitor 40 acts as parallel resonant circuit whilst when the switch 46 is open it acts as series resonant circuit. The coil 38 acts as transmitting and receiving coil which transmits the RF interrogation pulse supplied to it by the oscillator 20 and receives the RF signal sent back by the responder unit 12.

The RF signals received by the resonant circuit are supplied to two amplifiers 52, 54 which are so designed that they amplify the RF signals received and limit them for pulse shaping. Connected to the amplifiers is a parallel resonant circuit 56 which ensures the necessary reception selectivity. The output of the amplifier 54 is connected to a clock generator 58 which from the signal supplied thereto generates a clock signal and supplies the latter to the input 60 of the microprocessor 18.

In addition, the output signal of the amplifier 54 is supplied to a demodulator 62 which demodulates the signal applied thereto and supplies it to the input 64 of the microprocessor 18.

The information contained in the received RF signal is supplied after the demodulation in the demodulator 62 via the microprocessor 18 to a random access memory 66 so that it can be stored in the latter. Between the microprocessor 18 and the random access memory 66, a bi-directional connection 68 is disposed which makes it possible to enter information from the microprocessor 18 into the random access memory 66 and also to transfer information in the opposite direction. The information stored in the random access memory 66 can be taken off at a jack 70.

A display unit 72 fed by the microprocessor 18 makes it possible for the operator to view the data contained in the received RF signal.

Since in this embodiment the interrogator unit 10 is a portable device, a rechargeable battery 74 is provided as a power supply. The output voltage of the battery 74 is supplied after closing a switch 76 to the terminals designated by "+" of selected chips in the interrogator unit 10. The supply voltage is however supplied to the two amplifiers 52, 54, the clock generator 58 and the demodulator 62 via a separate switch 78 which is controlled by the microprocessor 18. This makes it possible for those circuit elements to be supplied with voltage and thus active only during a predetermined period of time within the total operating cycle.

The battery 74 can be charged by a voltage induced in a coil 80, rectified in a rectifier 82 and smoothed by means of a capacitor 84. Preferably, the voltage is induced in coil 80 via a coil 112 in the base unit 16. A charge sensor 83 detects when a charge voltage is induced in the coil 80, i.e. a charging operation of the battery 74 is taking place. It then emits to the input 88 of the microprocessor 18 a corresponding message signal.

A further switch 90, controlled by means of a signal from the output 92 of the microprocessor 18, can in the closed state supply the output signals of the RF oscillator 20 via an amplifier 94 to a coupling coil 9. The switch 90 is typically used to activate the sending of a RF interrogation pulse to a responder unit 12 to initiate a data transfer to or from the responder unit 12.

With the aid of a modulator 98 the carrier wave of the RF oscillator 20 can be modulated. The modulation signal necessary for this purpose is supplied to the modulator 98 by the microprocessor 18 via a switch 100 which is controlled by means of a signal from the output 102 of the microprocessor. The modulation signal from the microprocessor 18 is supplied when the switch 100 is closed also to a coupling coil 104.

The base unit 16 also illustrated in FIG. 1 is a stationary unit which is connected via a jack 106 to the mains supply network. In a power supply 108 the operating voltage for a charging voltage generator 110 is generated, the output signal of which is supplied to a coil 112. A switch 114 is inserted between the power supply 108 and the charge voltage generator 110. The switch 114 is closed whenever the interrogator unit 10 is placed on the base unit 16. This is shown in FIG. 1 symbolically by a sort of actuating button 116 at the boundary line of the interrogator unit 10. The coils 112 and 80 are arranged in the base unit and interrogator unit 10 spatially in such a manner that they cooperate like the primary winding and secondary winding of a transformer when the interrogator unit 10 is placed on the base unit 16. In this manner the battery 74 can be charged contactless as often as required. The coils 96 and 104 in the interrogator unit 10 are so arranged that they are spatially very close to a coil 118 when the interrogator unit 10 is placed on the base unit 16. In this manner a contactless signal transmission between the coil 96 and the coil 104 on the one hand and the coil 118 on the other is possible. A demodulator 120 serves to demodulate the signals coming from the coil 118.

Figure 2A:
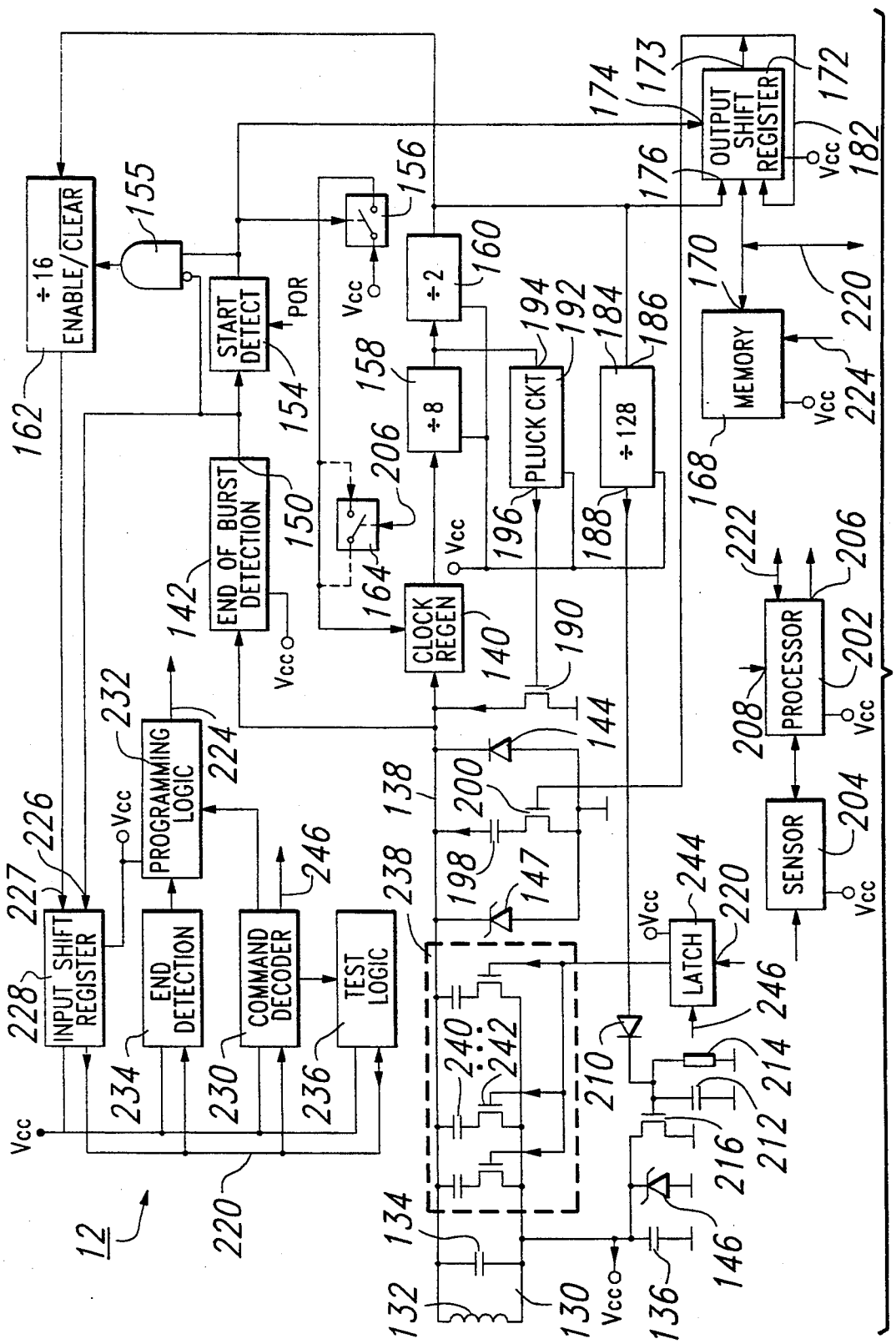
FIG. 2a is a block circuit diagram of a first preferred embodiment responder unit.

The first preferred embodiment responder unit 12 illustrated in FIGS. 2a contains for reception of the RF interrogation pulse a parallel resonant circuit 130 having a coil 132 and a capacitor 134. Connected to the parallel resonant circuit 130 is a capacitor 136 serving as energy accumulator. In addition the parallel resonant circuit 130 is connected to a RF bus 138. The resonant circuit 130 typically acts as both receiver and transmitter as is well known in the art. The preferred embodiment in which a half-duplex communication mode is used for communication between the interrogator 10 and responder 12 allows the single resonant circuit 130 to act as both receiver and transmitter operating at a single carrier frequency. In alternate embodiments of the present invention, separate circuits can be provide for receiver and transmitter. In this alternate embodiment, typically a full-duplex communication mode is used wherein the interrogator unit 10 sends a RF interrogation signal of a first frequency from its transmitter to the receiver of the responder unit 12 and the responder unit 12 sends a responsive RF signal of a second frequency from the responder unit transmitter to the receiver of the interrogator unit 10. A clock regenerator circuit receives the RF signal from the RF bus 138 and regenerates a clock signal 139 having a substantially square waveform. An "end of burst detector" 142 connected to the RF bus 138 has the function of monitoring the power level of a RF carrier at the RF bus 138. Such a RF carrier occurs at the RF bus 138 whenever the parallel resonant circuit 130 receives a RF interrogation pulse from the interrogator unit 10. The "end of burst detector" 142 emits at its output a RF threshold signal of predetermined value as soon as the power level of the RF carrier at the RF bus 138 drops below a predetermined threshold value. By connecting a diode 144 to the RF bus 138, the RF carrier is rectified and as a result the capacitor 136 is charged. The energy stored in capacitor 136 is proportional to the energy contained in the RF interrogation pulse. Thus, after reception of the RF interrogation pulse a DC voltage can be taken off at the capacitor A zener diode function 146 connected to the capacitor 136 ensures that the DC voltage which can be tapped off does not exceed a value defined by the zener voltage of the diode 146 in practical implementations such as within an integrated circuit, the zener diode function 146 might be accomplished by a number circuits well known in the art for limiting voltage. A zener diode function 146 serves a similar function to prevent the voltage on the RF bus 138 from becoming too great. Initially upon interrogation of the responder unit 12 the interrogator unit 10 sends a RF signal to the responder unit for the express purpose of charging the responder unit 12. This is referred to as the charge phase. During the charge phase the interrogator unit 10 continues to provide an RF carrier for as long as is necessary to supply sufficient energy to the responder unit 12. The charge phase ends and the programming phase is initiated as soon as there is a brief (less than the Pre-Bit Time) lapse in the RF transmission. If the lapse in time is greater than the Pre-Bit Time, typically this means that no programming phase is initiated and the transponder arrangement is going directly from the charge phase to the read phase. Alternatively, another possible situation for the time lapse being greater than the Pre-Bit Time is when moving from the programming phase to the read phase. During the read phase, the carrier from the responder unit is modulated with data from the responder unit memory 168.

A Power-On-Reset (POR, not shown) circuit provides a POR signal to a start detect circuit 154. This POR circuit monitors the Vcc level and is activated when the Vcc level rises from a level below a certain DC threshold to a level above a certain DC threshold. Typically, the POR signal occurs within the charge phase of the responder unit 12. POR circuits are well known in the art, indeed they are commonly used in almost all of the class of circuits known as "state machines" so that the circuits may be initialized to a known state. The start detect circuit 154 upon receiving the POR signal will then monitor the output 150 of end of burst detection circuit 142. At output 150 an end of burst signal (EOB) is provided. Upon receipt of an affirmatively stated EOB subsequent to the affirmatively stated Power-On-Reset signal, start detect circuit 154 switches power to the clock regenerator circuit 140 via switch 156. Output of start detect circuit 154 will remain positively asserted until a subsequent POR is received. All parts of the transponder other than the clock regenerator 140 are continuously supplied with Vcc, but preferably consume a negligible amount of power in their inactive states (i.e. when the clock regenerator 140 is inactive) due to the utilization of low power CMOS technology.

With further reference to FIG. 2a, a divider 158 receives clock signal 139 and divides its frequency, preferably by a factor of eight. A pluck circuit 192 preferably sends a momentary pulse each time it is so triggered by the divided clock signal as received from divider 158. This pluck circuit 192 maintains the oscillation of resonant circuit 130 by momentarily rendering field-effect transistor or FET 190 conductive and forming therethrough a conductive path between the resonant circuit 130 and ground via RF bus 138 such that the resonant circuit gains electrical energy from storage capacitor 136. This pluck circuit 192 is figuratively named to describe the maintaining of the oscillation of resonant circuit 130 much like the plucking of a guitar string maintains the oscillation of the guitar string. While this "plucking" action will momentarily lower the voltage on RF bus 138 the duration of the pulse is not sufficient given the channel resistance of FET 190 to lower the voltage below the threshold to trigger the end of burst detection circuit 142 to activate. A second divider 160 divides the clock signal 139 again by a factor of two such that the clock frequency at the output of divider 160 is 1/16 the original clock frequency.

Still referring to FIG. 2a, the read circuitry for the preferred embodiment will now be described. Connected to the output of second divider 160 is the shift clock input 176 of an output shift register 172 such that data is shifted through this register 172 at 1/16 the original clock frequency. Output shift register 172 receives a parallel load from memory 168 or another source via data bus 220 upon receipt at its shift/load_input 174 of a "load_" signal from the output of start detect circuit 154. Subsequent to loading of the output shift register 172 the signal from start detect circuit 154 is asserted positively and hence a "shift" signal is received at the shift/load_ input 174 of register 172. While the "shift" signal is positively asserted data will be shifted through output shift register at 1/16 the original clock frequency due to the clock signal received at the shift clock input 176. As shown in the figure, the data recirculates through the output shift register 172 via the data path 182 and also feeds the gate of FET or modulator 200 via data path 182. The output shift register data are preferably low for a certain time (Pre-Bit-Time) and high or low dependent upon the data loaded therein. The Pre-Bit-Time is used in this embodiment to allow the interrogator receiver coil 38 time to recover from power burst overload (Charge Phase) and it is used to discriminate the read function from the write function as will be described below. While the output of output shift register 172 is low then the FET 200 is not conducting. While the output of output shift register 172 is high FET 200 conducts, thereby connecting capacitor 198 to the resonant circuit 130 and lowering the resonant frequency thereof. In this manner a frequency modulation of the resonant or carrier frequency of resonant circuit 130 is accomplished in response to the data applied to FET 200. A low or "zero" signal is represented when the original resonant frequency of the resonant circuit 130 is maintained throughout a bit period. A high or "one" signal is represented when the new resonant frequency of the parallel combination of original resonant circuit 130 in parallel with capacitor 198 occurs within a bit period.

With still further reference to FIG. 2a, the operation of a discharge logic circuit will now be described. A third divider 184 receives at its input 186 the output of divider 160 and divides the clock signal by yet another factor of 128. The division factor of third divider 184 is 128 in this instance due to the preferred data transmission bit length of 128. If this bit length were to change, then the division factor of third divider 184 would preferably change correspondingly. A diode 210 maintains unidirectional current flow from the divider 184 into a parallel RC combination of a capacitor 212 and a resistor 214 which maintain charge on the gate of a field-effect transistor or FET 216 for a known duration. With the diode 210 the capacitor 212 may be charged by divider 184, but must be discharged through resistor 214. The FET 216 serves to provide, when the gate of FET 216 maintained above a threshold voltage by the parallel combination of resistor 214 and capacitor 216, a low impedance discharge path for storage capacitor 136 to ground. In this manner, after transmission of a complete data frame in this case of 128 bits (read phase) from the transponder 12 to the interrogator unit 10, the remaining energy in the transponder 12 is eliminated by a short circuit across the charge capacitor 136. This action secures that the transponder is correctly initiated during the next charge phase and does not rest in a undefined or incorrect state such that a subsequent charge-up could be blocked. Additionally by this function, each transponder 12 within the field of the interrogator 10 has an identical start condition.

Still referring to the circuitry of responder unit 12 as shown in FIG. 2a, the circuitry with which data may be written into responder unit 12 (the write function) will now be described. In a preferred embodiment of the invention the interrogator unit 10 may pulse pause modulate (PPM) the RF transmission. This signal is reflected on RF bus 138. As is well known in the art, a pulse pause modulation system operates by alternatively activating and deactivating a carrier wave. During the time period in which the carrier is deactivated, the "end of burst detector" 142 senses a decrease in RF energy and is activated. after the start detect circuit 154 is enabled by the POR signal, the start detect circuit 154 is then activated by the first EOB signal caused by the Start Bit. Although a Start Bit is used in this preferred embodiment due to the fact that each data bit status is transmitted by the presence or absence of a carrier wave off phase as will be further described. Other embodiments are possible, however, in which no Start Bit needs to be transmitted. The duration of the time period in which the carrier is deactivated, known as the "off" phase, is shorter than the Pre-Bit-Time of the read phase. This particular requirement is used within this embodiment due to the fact that during the off phase, the output shift register 172 will start to shift. But since the Pre-Bit-Time is greater than the off phase the output shift register is unsuccessful in shifting anything but zeros out, so in fact FET 198 is never activated and inverted and no unwanted modulation of the carrier 138 will occur. The EOB signal is then deactivated when the carrier returns. The activations and deactivations of the EOB signal serve to provide a data stream to the data input 226 input of input shift register 228. Regardless of the transitions of EOB start detect circuit 154 maintains its output active until a new POR signal is received, thus maintaining power to clock regenerator circuit 140 via switch 156.

A fourth divider 162 is provided receive the clock signal from second divider 160 and the divide clock signal again by 16 in order to supply the clock input 227 of the input shift register 228 with an Input Clock signal. In the preferred embodiment, then, the write data rate is 1/256 of the resonant frequency or receive clock frequency. Provision must be made that the data is shifted into the input shift register 228 while the data is stable. This can be assured in the following manner. The fourth divider 162 is activated by the start detect circuit 154 via AND gate 155. Each consecutive "zero" bit or "low" bit received by end of burst detection circuit 142 positively asserts the output 150 of the burst detection circuit. The positively asserted signal is then received the negative logic input of AND gate 155. The negative logic input is indicated by a "bubble" at the input of AND gate 155 as is well known in the art. By definition of the AND function the output of AND gate 155 will then be negatively asserted, thereby clearing the fourth divider 162 and synchronizing the Input Clock to the Input Data.

End detection circuit 234 detects the end of a data frame if a certain bit combination is in the input shift register 228 and thereupon activates the programming logic 232 if a programming command has been previously received by command decoder 230. The data is then transferred from input shift register 228 to memory 168 or another memory via parallel data bus 220. Preferably, the memory the to which the data is transferred is an electrically-erasable programmable read only memory (EEPROM).

"end of burst detector" 142 is generally acting in the capacity of a pulse pause modulation (PPM) demodulator. Many other modulations schemes are known in the art for radio communication and instead of the "end of burst detector", another demodulator might be used for another of such schemes.

Provision is also made in this preferred embodiment to initiate a test sequence via test logic 236. Test logic 236 receives signals from command decoder 230 and data from data bus 220 and may initiate numerous test routines such as are commonly implemented in the field of logic circuit design. The results of these test routines may be placed on data bus 220 and output by shift register 172 to the modulation circuitry via field-effect transistor 200.

A programmable tuning network 238 is provided in the preferred embodiment of the present invention. This programmable tuning network 238 operates by switching a network of parallel capacitors 240, each capacitor 240 being connected through a field-effect transistor or FET 242 to ground. Each field-effect transistor is connected to a latch 244 which receives and latches data from the memory 138 or from command decoder 230 via data bus 220 under control of a latch signal 243 from the command decoder 230. By switching a field-effect transistor 242 to a conducting "ON" state, its associated capacitor 240 is connected in parallel with parallel resonant circuit 130. This added capacitance will lower the resonant frequency of the parallel resonant circuit 130. By switching a field-effect transistor 242 to a non-conducting "OFF" state, its associated capacitor 240 is floating and has no effect on the parallel resonant circuit 130. A network 238 of FET/capacitor pairs 240,242 can provide many different values of added capacitances depending on the combinations of each capacitor's 240 relative value as is well known in the art. Alternatively, latch 244 could be a one-time-programmable (OTP) memory such that the data is fixedly stored therein and the device may be permanently programmed to set the value of programmable tuning network 238.

Many schemes exist for command decoder 230 to interpret the sequence of bits received from input shift register 228 via data bus 220 as commands or data. By way of example, the following information format could be used:

| Start | Group Address | Unit Address | Command | Data | Stop |
|-------|---------------|--------------|---------|------|------|
| XXX...X | XXX...XXX | XXX...XXX | XXX...XX | XXX...X | XXXX |

In the above table, the "X"'s indicate data positions which may be filled by logical 0's and 1's. The number of bits in each group are, of course, merely exemplary. The format of this information sequence would be determined by the needs of the particular application. Indeed, upon examination of this specification, other orderings of the groups of information would be readily apparent to one of ordinary skill in the art. It is therefore intended that the appended claims encompass any such modifications or embodiments. As shown, the first group of bits are the Start Signal or Start bits. These bits would preferably be followed by a Group Address which the command decoder 230 might compare to an address stored in responder unit memory 168. If group addressing was not desired a format could be sent by the interrogator unit such as all zeros in the Group Address indicating the responder unit command decoder 230 should compare the following Unit Address to another address stored in memory 168. Should Group Addressing be desired, however, interrogator unit 10 might send a Group Address followed by all zeros in the Unit Address portion of the sequence to so indicate. Alternatively, the Group Addressing might even be used in conjunction with the Unit Addressing. Once the proper addressing has been established, the address sequence might be followed by a Command which could be used to indicate the next action desired from the responder unit 12. The command might then be followed by Data on which the responder unit 12 might operate. For example, instead of simply responding to the interrogator unit's 10 inquiry, the addresses stored within responder unit memory 168 for comparison to Group and/or Unit Addresses within the data sequence might be updated. Finally, a Stop Signal or Stop bits might follow to indicate the end of the information transmission from interrogator unit 10.

In operation of the group addressing scheme it is quite likely that the interrogator unit 10 might send a RF interrogation pulse directed to a particular Group Address and a number of responder units 12 within communication range of the interrogator unit 10 will have addresses corresponding to this Group Address. In this instance, all the responder units 12 would respond to the RF interrogation pulse, causing the interrogator unit 10, in all likelihood, to receive an unintelligible response. An example of an unintelligible response might be when the interrogator unit 10 expects a stream of data in a certain format (i.e. an alternating sequence of 0's and 1's) and that format is not detected, then it is likely that a number of responder units are simultaneously transmitting. Preferably, at this point, the interrogator unit 10 might be satisfied to know that a number of responder units 12 are present within its communication range. Alternatively, the interrogator unit 10 might either modify its transmission strength in an attempt to physically isolate a single responder unit, or the interrogator unit might begin to poll the responder units 12 by their Unit Addresses.

The factors of the dividers disclosed in the embodiments listed herein are chosen to fit the particulars of each design. The division factors should be computed in each case to most optimally perform the task for which they were designed.

Figure 2B:
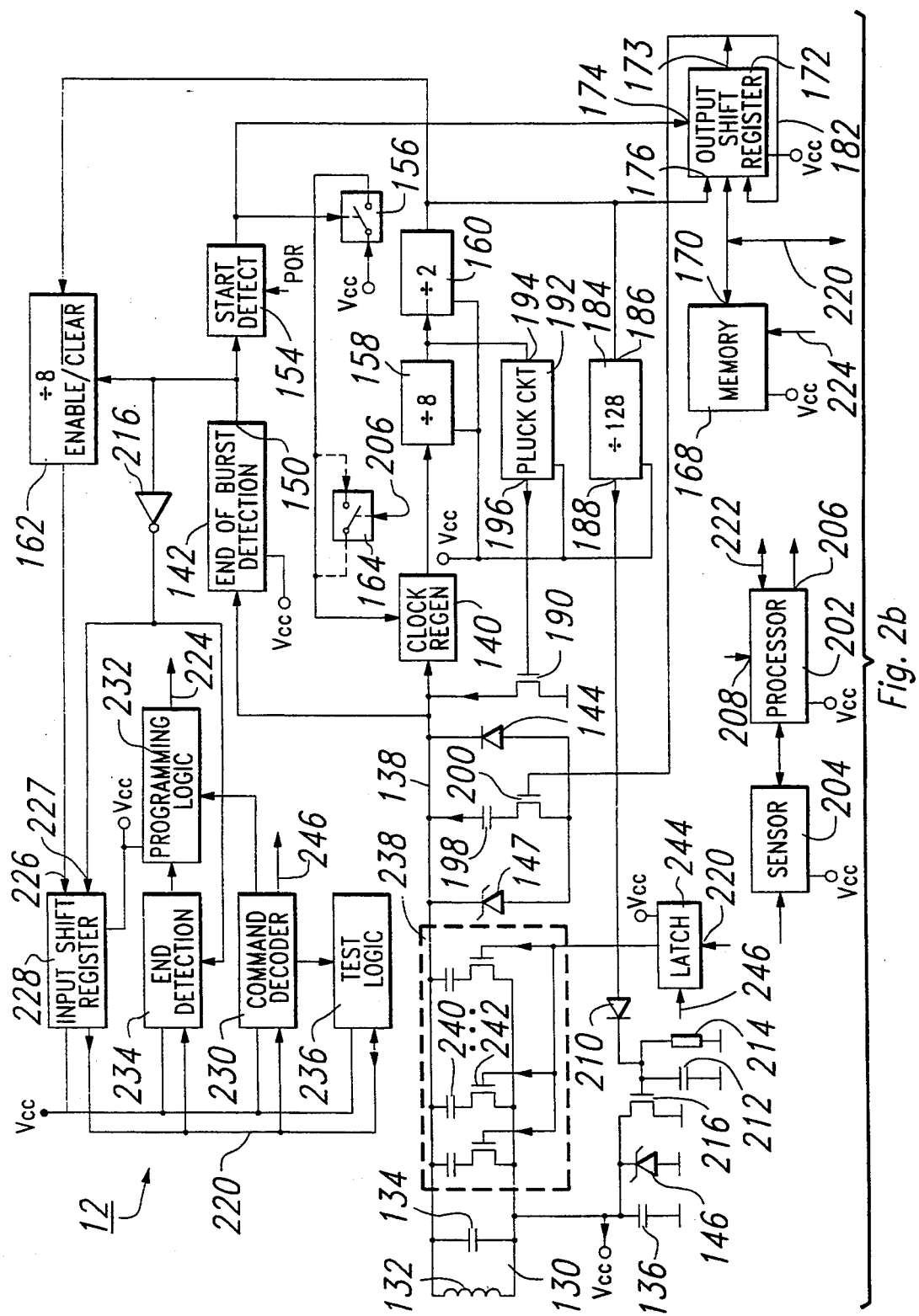
FIG. 2b is a block circuit diagram of a second preferred embodiment responder unit.

The second preferred embodiment responder unit 12a shown in FIG. 2b is substantially similar to the first preferred embodiment responder unit 12 which was shown in FIG. 2a. The general functions and the read functions for the second preferred embodiment responder unit 12a is preferably the same as that described above for first preferred embodiment responder unit 12. The write function will differ slightly from that described hereinabove with respect to the first preferred embodiment responder unit 12.

The write function with regard to second preferred embodiment responder unit 12a is illustrated in FIG. 2b. The details of a write operation will be later described in greater detail with regards to FIG. 5. The components unique to the second preferred embodiment responder unit 12a will now be described. As with the first preferred embodiment responder unit 12, an "end of burst detector" 142 is connected to the RF bus 138 and has the function of monitoring the power level of a RF carrier at the RF bus 138. Such a RF carrier occurs at the RF bus 138 whenever the parallel resonant circuit 130 receives a RF interrogation pulse from the interrogator unit 10. The "end of burst detector" 142 emits at its output a RF threshold signal of predetermined value as soon as the power level of the RF carrier at the RF bus 138 drops below a predetermined threshold value.

Second preferred embodiment responder unit 12a differs in that it determines whether a received data bit is a "zero" or a "one" bit by the duration of the time period for which the RF carrier is deactivated (i.e. Pulse Width Modulation, PWM). For example, if the duration for which the carrier is deactivated is less than six clock cycles, the data could be defined as "zero" or "low". If the duration for which the carrier is deactivated is greater than six clock cycles, the data could be defined as "one" or "high". Obviously the bit definitions could be reversed. A start bit circuit 154 which would generate a start bit as in the first preferred embodiment could be used. However, since every data bit comprises some kind of signal transition and the actual data status is dependent on the duration of the signal transition, a Start Bit is no longer necessary.

The output 150 of RF threshold detection circuit 142 is used in this embodiment as an Input Clock signal for input shift register 228. Assuming the input shift register 228 uses the rising edge of the Input Clock and assuming that RF threshold detection circuit 142 provides a "high" signal during the time periods during which the carrier is deactivated, the output 150 of RF threshold detection circuit 142 is inverted by an inverter 216 before being received by the input shift register 228. This assures that the data received at the input shift register 228 is valid when it is latched by the Input Clock signal. The Input Data received at the data input 226 of the input shift register 228 is provided by a divide-by-six divider 162a which operates in a different function than the divider 162 provided in the first preferred embodiment. Divider 162a counts the clock transitions of a clock signal having 1/16 the resonant frequency as it is output from divider 160. Divider 162a receives at its enable/clear_ input the output 150 of RF threshold detector 142. Normally this input will be held low such that the divider remains in its cleared state. A "high" signal from "end of burst detector" 142 enables the divider 162a to begin counting clock transitions. For a "zero" signal the length of the pulse is defined to be less than six clock cycles such that the divider 162a never reaches its maximum count and hence never is asserted "high". As output 150 of "end of burst detector" 142 does transition regardless of the length of the pulse, EOB through inverter 216 acts to load a "zero" into input shift register 226. If however, the length of the pulse is defined to be greater than six cycles for a "one" signal, then the divider 162a does reach its maximum count and asserts its output "high". Thus upon transition of the Input Clock 227 to the input shift register 228 a "one" is loaded therein via the Input Data 226 signal. The end detection circuit 234 counts the number of input clocks to activate the programming logic 232 if a correct data frame is received and the command decoder 230 has detected a subsequent programming command. As before, the data is then transferred from input shift register 228 to memory 168 or another memory via parallel data bus 220. Preferably, the memory to which the data is transferred is an electrically-erasable programmable read only memory (EEPROM).

In practical use, numerous objects, each provided with a responder unit 12,12a, are addressed in succession by the interrogator unit 10 by transmission of a RF interrogation pulse. The information returned by the responder units 12,12a is received by the interrogator unit 10 and stored in the random access memory 66. In the construction described in each case, the responder units 12,12a which are within the transmitting range of the interrogator unit 10 are addressed. It may, however, also be desirable to address amongst a larger number of responder units 12,12a only quite specific individual units and cause them to return the information stored in them. This can be achieved by providing the processor 202 in the responder unit 12,12a. Firstly, it must be ensured in the interrogator unit 10 that with aid of the modulator 98 cooperating with the microprocessor 18, the RF interrogation pulse to be transmitted is modulated with the address which is provided for the responder unit 12,12a to be specifically activated. The processor preferably monitors the data received by input shift register 228 and placed upon data bus 220, then determines whether the address applied to it coincides with an address fixedly or temporarily set in the responder unit 12,12a. If the processor 202 detects such coincidence, it furnishes at its output 206 a start signal which instead of the start signal furnished by the start detect circuit 154 in the use previously described, allows the sending back to the interrogator unit 10 the information contained in the memory 168 by enabling the clock regeneration circuit 140. In this manner, amongst a large number of objects provided with responder units 12,12a it is possible to specifically search for and find those with specific addresses.

It has been shown that in the responder unit 12,12a, the energy contained in the received RF carrier wave is stored and utilized for supplying assemblies necessary for the transmitting back of the stored data. The clock signals necessary for the control and synchronization are derived from the RF carrier wave which is generated immediately after termination of the RF interrogation pulse in the responder unit 12,12a. Due to the derivation of the clock signal from the RF carrier wave signal a very good synchronization is achieved between the transmitter side and receiving side. The arrangement is not sensitive to frequency changes and calibration is therefore not necessary.

The responder unit 12,12a described can be made almost completely as an integrated circuit so that it can be produced with very small dimensions. Only the coil 132, the capacitor 134 and the capacitor 136 need be provided as individual components outside the integrated circuit. A responder unit 12,12a with this construction could, for example, be disposed in each individual spare part of a large store of spare parts from which individual spares are automatically picked when required. Using an interrogator unit 10 the spares of a desired type or characteristic could be specifically sought in the store and then automatically removed.

As already mentioned at the beginning the responder 12,12a can for example also be attached to animals in a large herd and employing the interrogator unit 10 the animals can be continuously supervised and checked. Since the components of the responder unit 12,12a can be made very small it is even possible to make the entire unit in the form of a small pin which can be implanted under the skin of the animal. A corresponding construction is shown in FIG. 7. The coil in this example could be wound round a small ferrite core 220 which increases the sensitivity.

The data is modulated onto the responder unit carrier wave by use of a FET 200 which can connect a capacitance in parallel with the resonant circuit 130. Many other modulators 200 can be envisioned which could modulate carrier waves generated using any of a number of possible carrier wave generators.

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in full-duplex transponder arrangements or half-duplex transponder arrangements. Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Discrete components or fully integrated circuits in silicon (Si), gallium arsenide (GaAs), or other electronic materials families, as well as in optical-based or other technology-based forms and embodiments might be used to implement the circuits described herein. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating between an interrogator unit and at least two responder units, said method comprising the steps of:
   transmitting from said interrogator unit to each of said responder units at least one interrogation pulse of a selected frequency and having a transmitted Group Address modulated thereon;
   receiving by each of said responder units said interrogation pulse;
   demodulating said interrogation pulse within each of said responder units;
   comparing said transmitted Group Address to a responder group address stored within a memory within each of said responder units;
   activating within each of said responder units a threshold signal upon detection of a decreasing power level of said interrogation pulse;
   exciting a carrier wave within each of said responder units, said carrier wave having substantially said selected frequency;
   transmitting an response from each of said responder units, said response generated upon activation of said threshold signal and upon comparison of said transmitted Group Address to said responder group address;
   detecting the presence of more than one responder unit by receiving an unintelligible response at said interogator unit.

2. The method of claim 1 and further comprising the step of modulating said RF carrier wave to provide information in said RF response to said interrogator unit.

3. The method of claim 1 and further comprising the step of transmitting a second interrogation pulse from said interrogator unit, said second interrogation pulse having a transmission strength which is varied from said at least one interrogation pulse.

4. The method of claim 1 wherein each of said responder units further includes a unique unit address within said memory, and wherein said interrogator unit further transmits an interrogation pulse having a transmitted unit address modulated thereon.

5. The method of claim 4 wherein one of said responder units responds to said interrogation pulse having a transmitted unit address modulated thereon.

6. The method of claim 1 wherein said interrogator unit comprises:
   a microprocessor,
   a carrier wave generator oscillating at a selected frequency, an interrogator unit FSK modulator for modulating by frequency shift keying the carrier wave output of said carrier wave generator with data comprising a Group Address to form a RF interrogation signal, a transmitter operably connected to receive the output of said modulator for transmission of said RF interrogation signal, and a receiver for receiving a RF response.

7. The method of claim 1 wherein each of said responder units comprise:

a responder unit receiver for receiving said interrogation signal, an energy accumulator for storing the energy contained in said interrogation signal received by said responder unit by which the components of said responder unit may be supplied with energy, a responder unit FSK demodulator for demodulating the output of said responder unit receiver, said memory containing said responder group address, a responder unit controller operably connected to said memory for comparing said responder group address to said transmitted Group Address, a responder unit carrier wave generator operable for providing a responsive RF carrier having substantially said selected frequency, a responder unit FSK modulator for modulating said responsive carrier, circuitry operably connected to the output of said carrier wave generator for producing control signals for maintaining and modulating said responsive carrier, a threshold detector, a triggering circuit to which said threshold detector and said responder unit controller are connected for generating a signal for initiating operation of said responder unit carrier wave generator whenever the level of the interrogation signal received by the responder unit receiver drops below a predetermined value, and said responder unit controller detects a match between said responder unit address and said Group Address, and a responder unit transmitter for transmitting said responsive carrier from said responder unit back to said receiver of said interrogator unit.

8. A method of detecting the presence of a number of responder units which are identifiable by a selected group address code, said method comprising the steps of:

transmitting at least one interrogation pulse having said selected group address code modulated thereon;

determining whether any of said plurality of responder units are within range of said interrogator unit, said determining step accomplished by:

i) determining that none of said responder units are within range by not receiving a response signal;

ii) determining that one of said responder units is within range by receiving an intelligible response signal; or iii) determining that more than one of said responder units are within range by receiving an unintelligible response signal.

9. The method of claim 8 and further comprising the step of transmitting a second interrogation pulse, said second interrogation pulse having a transmission strength which is varied from that of said at least one interrogation pulse.

10. The method of claim 8 and wherein each of said responder units further includes a unique unit address within said memory, and further comprising the step of transmitting an interrogation pulse having a transmitted unit address modulated thereon.

11. The method of claim 10 wherein one of said responder units responds to said interrogation pulse having a transmitted unit address modulated thereon.

* * * * *